(12) United States Patent
Dale-Jones

(10) Patent No.: US 9,835,081 B2
(45) Date of Patent: Dec. 5, 2017

(54) SUPERCHARGER ASSEMBLY

(71) Applicant: Jaguar Land Rover Limited, Coventry (GB)

(72) Inventor: Graham Dale-Jones, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 62 days.

(21) Appl. No.: 14/787,561

(22) PCT Filed: Jun. 13, 2014

(86) PCT No.: PCT/EP2014/062315
§ 371 (c)(1),
(2) Date: Oct. 28, 2015

(87) PCT Pub. No.: WO2014/198864
PCT Pub. Date: Dec. 18, 2014

(65) Prior Publication Data
US 2016/0084149 A1 Mar. 24, 2016

(30) Foreign Application Priority Data
Jun. 14, 2013 (GB) .................................. 1310639.8

(51) Int. Cl.
*F02B 33/34* (2006.01)
*F02B 39/04* (2006.01)
(Continued)

(52) U.S. Cl.
CPC .............. *F02B 33/34* (2013.01); *F02B 33/40* (2013.01); *F02B 39/04* (2013.01); *F02B 39/10* (2013.01);
(Continued)

(58) Field of Classification Search
CPC .......... F02B 33/34; F02B 33/40; F02B 39/04; F02B 39/10; F02B 39/12; F02B 67/06;
(Continued)

(56) References Cited

U.S. PATENT DOCUMENTS

2006/0263203 A1 11/2006 Barker
2007/0137626 A1 6/2007 Turner
(Continued)

FOREIGN PATENT DOCUMENTS

DE 4124479 A1 1/1993
EP 1 801 386 A1 6/2007
(Continued)

OTHER PUBLICATIONS

Combined Search and Examination Report, GB 1310639.8, dated Dec. 17, 2013, 5 pages.
(Continued)

*Primary Examiner* — Audrey K Bradley
(74) *Attorney, Agent, or Firm* — Myers Bigel, P.A.

(57) ABSTRACT

The present invention relates to a vehicle supercharger assembly (14) comprising a generator comprising a first armature (14) being adapted for permanent drive from a source of motive power; a supercharger impeller (24) arranged to be driven via a gear train; an electric motor comprising a second armature (28), said second armature (28) being coupled to the gear train; a first clutch (32) for selectively coupling the first armature (14) to the gear train for driving the supercharger impeller (24) in a first mode of operation in which the electric motor is operable to adjust the speed of the supercharger impeller (24); and a second clutch (34), operable when said first armature (14) is coupled to the gear train, for selectively locking the gear train so as to prevent relative rotation of the first and second armatures in a second mode of operation.

20 Claims, 4 Drawing Sheets

(51) Int. Cl.
| | |
|---|---|
| *F02B 39/10* | (2006.01) |
| *F02B 39/12* | (2006.01) |
| *F02B 33/40* | (2006.01) |
| *F02D 41/00* | (2006.01) |
| *F02B 67/06* | (2006.01) |
| *H02K 21/00* | (2006.01) |
| *H02K 7/11* | (2006.01) |
| *H02K 7/14* | (2006.01) |
| *H02K 7/18* | (2006.01) |
| *B60K 6/48* | (2007.10) |
| *F02N 11/04* | (2006.01) |
| *F02D 41/06* | (2006.01) |

(52) U.S. Cl.
CPC ............. *F02B 39/12* (2013.01); *F02B 67/06* (2013.01); *F02D 41/0007* (2013.01); *H02K 7/11* (2013.01); *H02K 7/14* (2013.01); *H02K 7/1815* (2013.01); *H02K 7/1823* (2013.01); *H02K 21/00* (2013.01); *B60K 6/48* (2013.01); *F02D 41/064* (2013.01); *F02D 2200/101* (2013.01); *F02D 2200/501* (2013.01); *F02N 11/04* (2013.01); *Y02T 10/144* (2013.01)

(58) Field of Classification Search
CPC ............. F02D 41/0007; F02D 41/064; F02D 2200/101; F02D 2200/501; F02N 11/04; H02K 7/11; H02K 7/14; H02K 7/1815; H02K 7/1823; H02K 21/00; B60K 6/48; Y02T 10/144

See application file for complete search history.

(56) References Cited

U.S. PATENT DOCUMENTS

| | | | |
|---|---|---|---|
| 2007/0149336 A1* | 6/2007 | Sallstrom | B60K 6/485 475/5 |
| 2010/0275890 A1 | 11/2010 | McDonald-Walker | |
| 2012/0137681 A1 | 6/2012 | Hoess et al. | |

FOREIGN PATENT DOCUMENTS

| | | |
|---|---|---|
| GB | 2 398 108 A | 8/2004 |
| JP | 2012-530876 A | 12/2012 |
| WO | WO 2011/009693 A1 | 1/2011 |

OTHER PUBLICATIONS

International Search Report, PCT/EP2014/062315, dated Aug. 26, 2014, 7 pages.

Office Action corresponding to Japanese Application No. 2016-517636 dated Jan. 10, 2017.

* cited by examiner

FIGURE 5

| | Primary Clutch | | Secondary Clutch | | Epicyclic Planet Gears | |
|---|---|---|---|---|---|---|
| | Open | Closed | Open | Closed | Not driven | Driven |
| Cold start (Starter Motor) | ● | | ● | | ● | |
| Hot start / Stop Start (BISG) | | ● | | ● | | ● |
| Idle | ● | | Not Applicable | | ● | |
| Idle (After start low ambient) | | ● | | ● | | E2 act as additional alternator |
| Steady state – low load < 4000 rpm | ● | | Not Applicable | | ● | |
| Steady state – high load < 1500 rpm | | ● | ● | | | ● |
| Steady state > 4000 rpm | ● | | Not Applicable | | ● | |
| Transient < 4000 rpm | | ● | ● | | | ● |
| Transient > 4000 rpm | ● | | Not Applicable | | ● | |
| ReGen Mode | | ● | | ● | | E2 act as additional alternator |

FIGURE 6

| | Primary Clutch | | Secondary Clutch | | Epicyclic Planet Gears | |
|---|---|---|---|---|---|---|
| | Open | Closed | Open | Closed | Not driven | Driven |
| Cold start (Starter Motor) | ● | | ● | | ● | |
| Idle | ● | | Not Applicable | | ● | |
| Steady state – low load < 4000 rpm | ● | | Not Applicable | | ● | |
| Steady state > 4000 rpm | ● | | Not Applicable | | ● | |
| Transient > 4000 rpm | ● | | Not Applicable | | ● | |
| Transient < 4000 rpm | | ● | ● | | | ● |
| Steady state – high load < 1500 rpm | | ● | ● | | | ● |
| Hot start / Stop Start (BISG) | | ● | | ● | | ● |
| Idle (After start low ambient) | | ● | | ● | | E2 act as additional alternator |
| ReGen Mode | | ● | | ● | | E2 act as additional alternator |

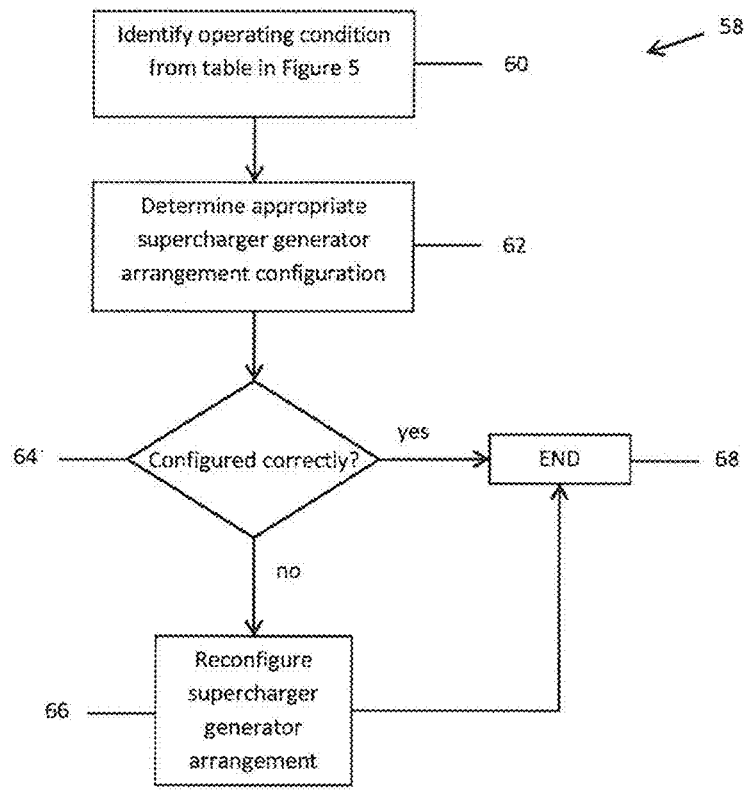
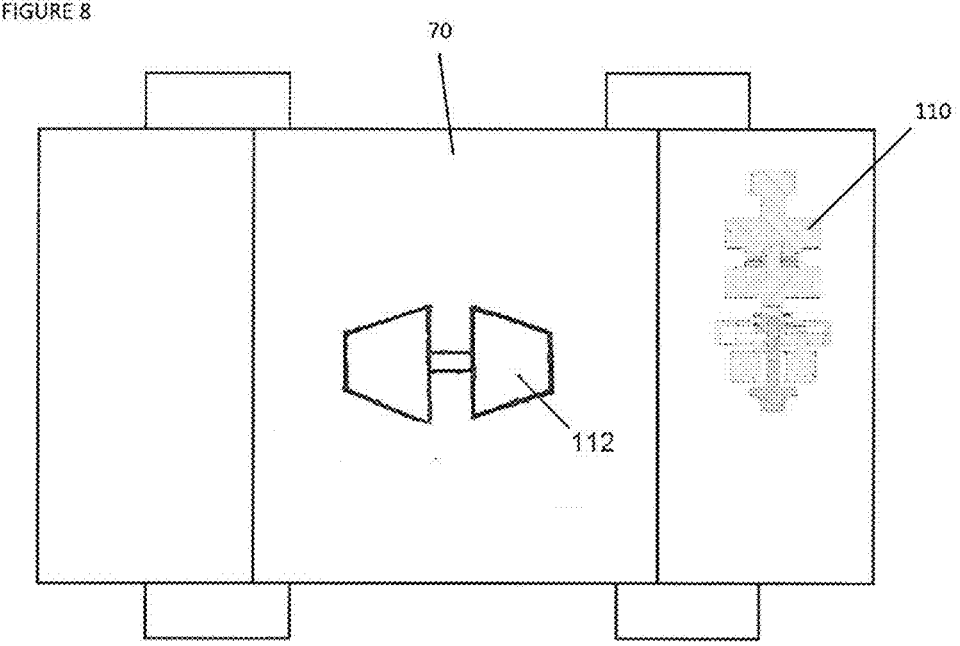

SUPERCHARGER ASSEMBLY

RELATED APPLICATIONS

This application is a 35 U.S.C. §371 national stage application of PCT Application No. PCT/EP2014/062,315, filed on Jun. 13, 2014, which claims priority from Great Britain Patent Application No. 1310639.8 filed on Jun. 14, 2013, the contents of which are incorporated herein by reference in their entireties. The above-referenced PCT International Application was published in the English language as International Publication No. WO 2014/198864 A1 on Dec. 18, 2014.

FIELD OF THE INVENTION

This invention relates to a supercharger assembly and in particular to a supercharger assembly for an internal combustion engine. Aspects of the invention relate to a supercharger assembly, to a control unit, to a method and to a vehicle.

BACKGROUND

Exhaust-driven turbochargers are typically provided for internal combustion engines in order to improve their performance by increasing the pressure, temperature and density of air in an engine inlet manifold which is used to supply a fuel/air mixture to the engine cylinders. This makes it possible to burn more fuel in each cycle of the engine, thereby increasing the power output. Exhaust-driven turbochargers make use of energy contained in the engine exhaust gases which would otherwise go to waste, and therefore can contribute to an improvement in the overall efficiency of the engine. However, single-stage turbochargers are not particularly effective at the low rates of exhaust gas flow which are associated with low engine operating speeds. This leads to the problem of 'turbo lag', i.e. a noticeable delay between a driver demanding power and the engine delivering the required response, because the engine speed needs to rise to a certain level before the turbocharger operates effectively. These problems can be ameliorated to some extent by the use of multi-stage turbochargers.

An alternative solution is to provide a supercharger in addition to the turbocharger. The supercharger is driven mechanically by the engine, to perform the same task of raising the pressure, temperature and density of air in the inlet manifold when the engine is running at low speeds such that the turbocharger is ineffective. A supercharger is engaged at the instant of a driver demanding power to substantially increase the volume of air admitted to the engine. With appropriate fuelling, a supercharger can eliminate turbo lag. An additional benefit is that the immediate increase in air flow allows the turbocharger impeller to spool up more quickly than would otherwise be the case. However, as the supercharger is driven mechanically by the engine, it increases the load on the engine and thereby increases fuel consumption. Therefore, as soon as the turbocharger is effective, the supercharger may be deactivated.

Control strategies have been developed for operating a supercharger and turbocharger both sequentially and simultaneously, so as to provide the desired range of engine performance and engine response.

Superchargers may be driven directly from the vehicle engine, but this arrangement tends to be inflexible should the installation envelope change, for example because the engine is to be fitted to a different engine compartment. Accordingly, it has been proposed to drive the supercharger mechanically via the armature of the vehicle generator, which provides for different installation possibilities within an engine compartment.

In one arrangement the supercharger is mounted co-axially with the vehicle generator, which is in turn driven by the vehicle engine by a multi-vee belt which is mounted on a pulley which is coupled to the generator. The generator provides energy to the vehicle, and the armature of the generator is coupled mechanically to the supercharger via an epicyclic gearbox so as to provide a coaxial arrangement which increases the speed of the supercharger relative to the generator.

An epicyclic gearbox is composed of an outer gear ring or annulus, a plurality of inner planet gears referred to below simply as planets, and a central gear or sun. The sun is located at the centre of the annulus, with the planets located between, and meshing with, both the sun and the annulus. The planets are attached to a common planet carrier, which maintains their relative positions. If the planet carrier is rotated while the annulus is held stationary, the planets are caused to rotate around the inner surface of the annulus. As the planets rotate, this in turn causes the sun to rotate at a speed which is determined by the gearing ratio. Alternatively, the planet carrier may be held in position, in which case rotating the annulus causes the sun to rotate. In this way, the epicyclic gearbox provides a coaxial arrangement which generates the required speed.

The speed at which the vehicle engine operates is variable within a range of, for example, 500 to 7000 revolutions per minute (rpm). In the case where the planet carrier is held stationary, the arrangement described above produces a speed increase of around 30:1, through a combination of a 3:1 increase from the pulley, and a 10:1 increase from the epicyclic gearbox. Therefore, the expected operating range for the supercharger impeller in this arrangement is 15,000 to 210,000 rpm. However, in order to achieve optimal performance, it is desirable to maintain the speed of rotation of the supercharger impeller at a relatively constant level during operation, generally at around 120,000 rpm.

To this end, it has been proposed to couple the planet carrier of the epicyclic gearbox to an electric motor. By driving this motor forward or in reverse, as required, the speed of the supercharger can be adjusted to its optimal level. Power for the supercharger motor is provided from the vehicle generator, which is necessarily increased in size. This arrangement provides the benefit that the main work of driving the supercharger is performed by the vehicle engine, while the electric motor merely provides a fine-tuning action. The power requirement of the supercharger is such that it is impractical to attempt to use an electric motor in isolation to drive the supercharger in a vehicle environment.

If a supercharger is used in combination with a turbocharger, the supercharger is primarily active when the engine is operating at low speed, for example when the vehicle is pulling away. Once the engine speed is sufficient, the turbocharger takes over from the supercharger, as this saves on energy requirements. In the above-described arrangement, the supercharger is directly connected to the generator, and is thus constantly driven even when not being used. However it can be made to idle by, for example, opening the delivery side to atmosphere. This reduces the load on the supercharger impeller, and therefore in turn the energy which the supercharger draws when idling is reduced.

However, this arrangement retains the disadvantage that the supercharger is permanently connected to the generator armature, and thus absorbs some energy even whilst deactivated. It is well known that energy efficiency is a key concern in the design and manufacture of new vehicles, and therefore any measures which can be taken to reduce consumption are important.

Against this background, it is an aim of the invention to provide an arrangement that avoids idling of the supercharger, but maintains flexibility of installation.

SUMMARY OF THE INVENTION

According to a first aspect of the invention there is provided a vehicle supercharger assembly comprising a generator, said generator comprising a first armature being adapted for permanent drive from a source of motive power. The supercharger assembly may comprise a supercharger impeller arranged to be driven via a gear train, and an electric motor comprising a second armature, said second armature being coupled to the gear train. A first clutch may be provided for selectively coupling the first armature to the gear train for driving the supercharger impeller in a first mode of operation, in which the electric motor is operable to adjust the speed of the supercharger impeller. A second clutch may also be provided, which is operable when said first armature is coupled to the gear train, for selectively locking the gear train so as to prevent relative rotation of the first and second armatures in a second mode of operation.

The first clutch beneficially enables the gear train and supercharger impeller to be disengaged when supercharging is not required. This prevents idling of the supercharger, which reduces the load on the vehicle engine, thus improving fuel consumption. By providing the additional functionality of locking the gear train, the second clutch allows the first and second armatures to be rotated together. This creates the possibility of using both the first and second armatures in cooperation which each other, either as a dual generator, or as a dual motor. If the second armature is used as a generator, this provides enhanced generating capacity for the vehicle. Alternatively, if the first armature is used as a motor, the first and second armatures can cooperate to provide a drive force.

Conveniently, the gear train may be an epicyclic gear train comprising an annulus, a sun, a plurality of planets and a planet carrier. In this embodiment, the first clutch couples the annulus to the first armature, the planet carrier is coupled to the second armature such that the electric motor is operable to drive the planet carrier, and the supercharger impeller is coupled to the sun.

The first mode of operation may be a supercharging mode in which the electric motor is driven by a generator comprising the first armature.

The second mode of operation may be at least one of the following modes: (1) a dual generator mode, in which the electric motor is arranged to operate as a generator to boost the generating capacity of the vehicle; and (2) a dual motor mode, in which the first armature is arranged to operate as a motor to provide a motive force to the vehicle, such that the assembly acts as a belt-integrated starter-generator (BISG) or as a micro-hybrid. Advantageously, when the second mode of operation is mode (2), the assembly may act as a micro-hybrid to propel the vehicle.

A third mode of operation may be defined when the gear train is decoupled from the first armature. The first clutch may be located between an end face of the first armature and the gear train.

The electric motor may provide variable, bi-directional drive to adjust the rotational speed of the supercharger impeller. This beneficially allows the rotational speed of the impeller to be adjusted relative to the speed of the engine, such that the speed of the impeller is optimised for all engine operating conditions.

The second clutch may be arranged to disengage the gearing mechanism by locking the epicyclic gear train such that relative rotation of the planets and the annulus is prevented.

The second clutch may conveniently be in the form of a dog clutch arranged to interengage the annulus and at least one of the planets. In this embodiment, the dog clutch may be arranged to be disengaged hydraulically.

According to a second aspect of the invention, there is provided a control unit for a supercharger assembly according to the first aspect, and comprising an electronic control unit for controlling operation of the first clutch means, the second clutch and the electric motor, and for enabling the supercharger. Said control unit may be further arranged to configure said first armature as a motor arranged to drive said source of motive power.

According to a third aspect of the invention, there is provided a method of operating a supercharger assembly according to the first aspect, wherein the method comprises uncoupling the first armature from the gear train and unlocking the gear train in at least one of the following conditions: (a) during an engine cold-start procedure; and (b) when the vehicle is idling.

The invention also extends to a method of operating a supercharger assembly according to the first aspect, wherein the method comprises operating the supercharger assembly in the second mode of operation and using the second armature as a generator in at least one of the following conditions: (1) when the ambient temperature is low and the engine is idling; or (2) when the speed of the vehicle is decreasing and there is no torque demand placed on the engine.

The invention also extends to a method of operating a supercharger assembly according to the first aspect, wherein the method comprises operating the supercharger assembly in mode (2) of the second mode of operation, and using the drive force to restart the engine following a cessation of engine operation.

The invention also extends to a method of operating a supercharger assembly according to the first aspect, wherein the method comprises operating the supercharger assembly in mode (2) of the second mode of operation, and using the drive force to provide motive power to the vehicle.

According to a fourth aspect of the invention, there is provided a vehicle having a supercharger assembly according to the first aspect. The vehicle may further comprise an exhaust-driven turbocharger, wherein the supercharger assembly and the turbocharger are arranged to operate sequentially.

The vehicle may be arranged to use the turbocharger and not the supercharger if the engine speed is above a first threshold. As the turbocharger offers a reduction in fuel consumption compared with the supercharger assembly, this arrangement beneficially ensures that when engine speed is sufficient to drive the turbocharger regardless of operating conditions, the turbocharger is always used.

The vehicle may be arranged to use the supercharger and not the turbocharger if the engine speed is below a second threshold, wherein the second threshold is lower than the first threshold. This ensures that the supercharger is automatically used when the engine speed in insufficient to drive the turbocharger.

According to a fifth aspect of the invention, there is provided a method for operating a vehicle according to the fourth aspect, wherein the method comprises uncoupling the first armature from the gear train when the engine speed is above the first threshold.

The invention also extends to a method of operating a vehicle according to the fourth aspect, wherein the method comprises coupling the first armature to the gear train when the engine speed falls below the second threshold.

The invention also extends to a method of operating a vehicle according to the fourth aspect, wherein the method comprises uncoupling the first armature from the gear train during steady-state engine operating conditions when the engine speed is above the second threshold speed, and when the vehicle is towing a relatively high load.

The invention also extends to a method of operating a vehicle according to the fourth aspect, wherein the method comprises coupling the first armature to the gear train and unlocking the gear train during a period of increasing torque demand upon the engine when the engine is operating below the first threshold speed.

According to a sixth aspect of the invention, there is provided a vehicle having a control unit according to the second aspect.

According to a further aspect, the present invention provides a vehicle supercharger assembly comprising;
- a generator comprising a first armature being adapted for co-rotation with a source of motive power;
- a supercharger impeller arranged to be driven via a gear train;
- an electric motor comprising a second armature, said second armature being coupled to the gear train;
- a first clutch for selectively coupling the first armature to the gear train for driving the supercharger impeller in a first mode of operation in which the electric motor is operable to adjust the speed of the supercharger impeller; and
- a second clutch, operable when said first armature is coupled to the gear train, for selectively locking the gear train so as to prevent relative rotation of the first and second armatures in a second mode of operation.

The first armature may be arranged for permanent drive from the source of motive power. For example, the first armature may be coupled to, for example, a vehicle engine, via a pulley and a belt. However, with such an arrangement, it will be appreciated that the first armature would not be driven via the pulley when the vehicle engine is not running. Nevertheless, rotation of the armature would cause rotation of the vehicle engine and vice versa.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. For example, features disclosed in connection with one embodiment are applicable to all embodiments, except where such features are incompatible.

BRIEF DESCRIPTION OF DRAWINGS

Embodiments of the present invention will now be described, by way of example only, with reference to the accompanying drawings, in which like components are assigned like numerals, and in which:

FIG. 5 is a table which illustrates an embodiment of a control regime which may be used with the arrangement shown in FIG. 3;

FIG. 6 is a rearrangement of the table in FIG. 5, in which different control scenarios have been grouped according to different configurations of the arrangement shown in FIG. 3;

FIG. 7 is a flow diagram illustrating a process for implementing the control regime in FIG. 5; and FIG. 8 is an illustration of a vehicle comprising the supercharger generator in FIG. 3.

DETAILED DESCRIPTION

Figure 1:
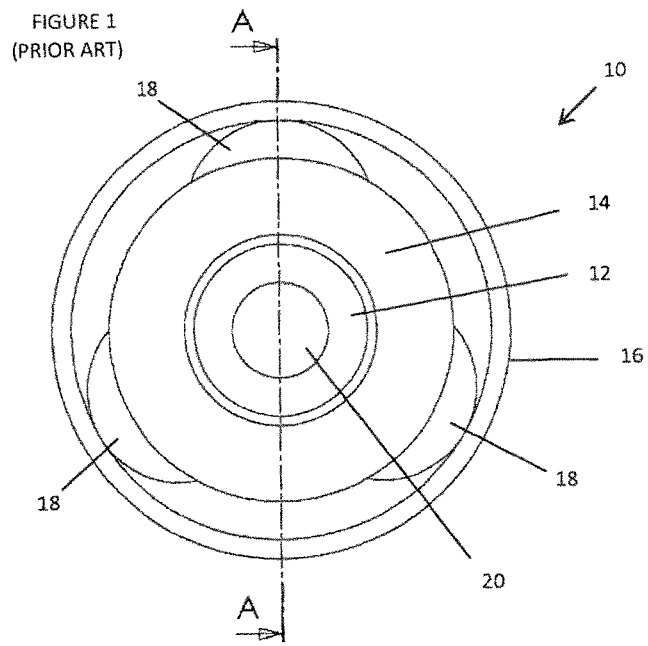
FIG. 1 is a schematic end elevation of a generator/supercharger assembly, representing a prior art arrangement.
Figure 2:
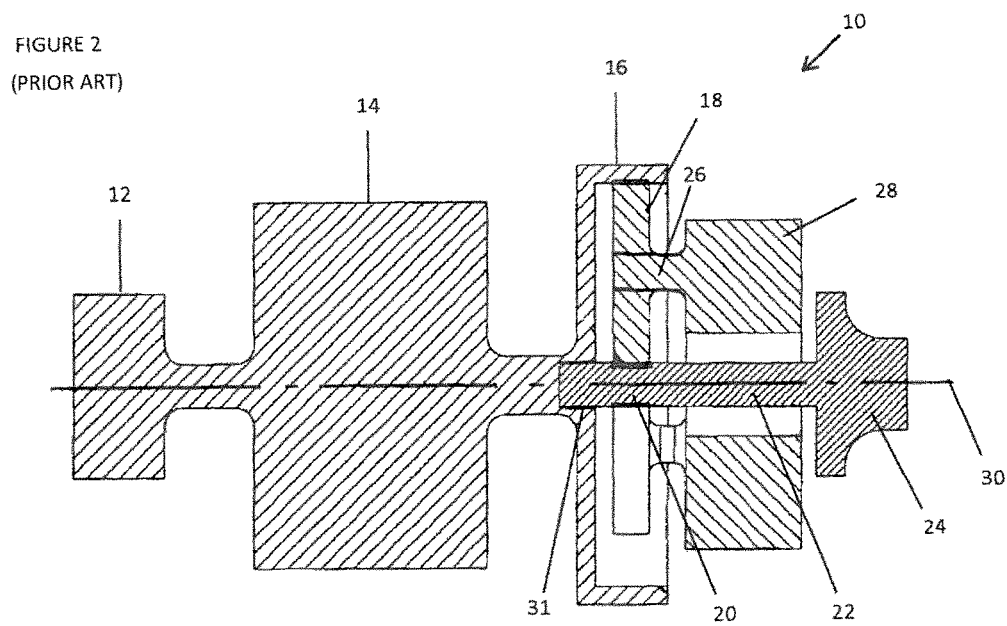
FIG. 2 is an axial cross-section on line A-A of FIG. 1.

With reference to FIGS. 1 and 2, a conventional supercharger generator 10 comprises a drive pulley 12, driven by a conventional serpentine auxiliaries drive belt of a vehicle engine (not shown). The pulley 12 is coupled to an armature 14 of a vehicle generator, e.g. an alternator. The generator armature 14 is in turn coupled to an annulus 16 of an epicyclic gear train, comprising a gearing mechanism having planets 18, and a sun 20 directly connected to a drive shaft 22 of an impeller 24 of a supercharger. The planets 18 are rotatably mounted on a planet carrier 26, which is connected to an armature 28 of an electric motor, which surrounds the drive shaft 22. The planets 18 mesh with both the annulus 16 and the sun 20, such that if the planet carrier 26 is held stationary, rotation of the annulus 16 causes both the planets 18 and the sun 20 to rotate. The impeller 24 is coupled to the sun 20 via the drive shaft 22, and therefore when the sun 20 rotates, the impeller 24 also rotates. The impeller 24 is located within a chamber (not shown) forming part of an air inlet system for the vehicle engine. When the impeller 24 rotates, this acts to raise the pressure, temperature and density of the engine inlet air in the inlet manifold, which increases performance of the engine as described earlier. The magnitude of the pressure, temperature and density rise of the inlet air is determined primarily by the rotational speed of the impeller 24.

The components of the supercharger generator 10 are arranged co-axially about a common axis of rotation 30, and the impeller drive shaft 22 is journalled in a cavity 31 which is formed at the centre of the annulus 16 as illustrated. Other components, such as the stators of the generator and motor, and the supercharger housing, are not illustrated, but will be understood to be necessary and form no part of the present invention, as such. The motor armature 28 is mounted so as to rotate with the planet carrier 26, and independently of the other components of the supercharger generator 10, according to a drive force supplied by the electric motor.

In use, when the vehicle engine is running, the auxiliaries drive belt drives the pulley 12, causing it to rotate about axis 30. The angular speed at which the pulley 12 rotates is typically three times the vehicle engine speed, due to the ratio of the diameter of the pulley 12 to the diameter of a corresponding pulley on the engine (not shown) which drives the auxiliaries drive belt. The rotation of the pulley 12 in turn causes the generator armature 14 to rotate, thereby generating electrical energy in the generator. Additionally, the annulus 16 of the epicyclic gearbox, which is coupled to the generator armature 14 and the pulley 12, is rotated at the same angular speed as the pulley 12. If the motor armature 28 and the planet carrier 26 are held stationary while the annulus 16 rotates, the planets 18 are rotated by the rotating annulus 16. The planets 18 rotate in the same sense as the annulus 16, although at a higher angular speed, because of their smaller diameter. Rotation of the planets 18 gives rise to rotation of the sun 20, the drive shaft 22 and the impeller 24, but in the opposite sense. The angular speed at which the impeller 24 rotates is therefore determined by the gear ratio of the sun 20 to the planets 18, and also the gear ratio of the planets 18 to the annulus 16. Typically, the components of the epicyclic gearbox are arranged to provide an overall gearing ratio of approximately ten to one. Therefore, when the motor armature 28 is held stationary, the angular speed at which the impeller 24 rotates is ten times that of the pulley 12, and therefore thirty times that of the vehicle engine. As noted previously, this provides a typical range of speed for the impeller 24 of between 15,000 and 210,000 rpm.

As mentioned earlier, it is generally desirable to control the speed of the impeller 24 within a much smaller range than this, at around 120,000 rpm, in order to provide optimal performance. Therefore, the motor armature 28 is driven by the motor in order to adjust the rotational speed of the impeller 24. If the vehicle engine speed is low, such that the speed of the impeller would be too low if the planet carrier 26 remained stationary, the motor turns the motor armature 28 and the planet carrier 26 in the opposite sense to the rotation of the annulus 16. This increases the rotational speed of the annulus 16 relative to the centres of the planets 18. This causes the planets 18 to move around the annulus 16 faster and therefore rotate about their own axes with a higher angular speed, which in turn increases the angular speed of the sun 20 and the impeller 24. In this way, the rotational speed of the impeller 24 is increased to its optimal level when the vehicle engine speed is low.

Correspondingly, if the engine speed is high, such that the rotational speed of the impeller 24 would be too high if the planet carrier 26 remained stationary, this is compensated for by rotating the motor armature 28 and planet carrier 26 in the same sense as the annulus 16, albeit at a slower rotational speed than that of the annulus 16. This reduces the rotational speed of the annulus 16 relative to the centres of the planets 18, and therefore reduces the speed at which the sun 20 and in turn the impeller 24 are rotated. In this way, the rotational speed of the impeller 24 is decreased to its optimal level when the vehicle engine speed is high.

A control system is provided in the vehicle, for example in a standard engine management unit (EMU), which determines the operation of the supercharger generator 10. Typically, when not in use, the supercharger is unloaded by opening the chamber in which the impeller 24 is located to atmosphere, and the epicyclic gear train idles with the supercharger impeller 24. When required, the supercharger is brought on-load, for example by closing a vent on the air chamber, and the speed of the supercharger impeller 24 is controlled as described above.

The generator capacity is chosen so that a sufficient electrical reserve is provided to meet normal vehicle requirements and the additional demand of the electric motor. Normal maximum vehicle demand may be about 2.5 kW, and the maximum demand of the motor armature 28 about 3 kW. It will thus be understood that the rotating mass of the generator armature 14 is substantially greater than for a non-supercharger variant.

Figure 3:
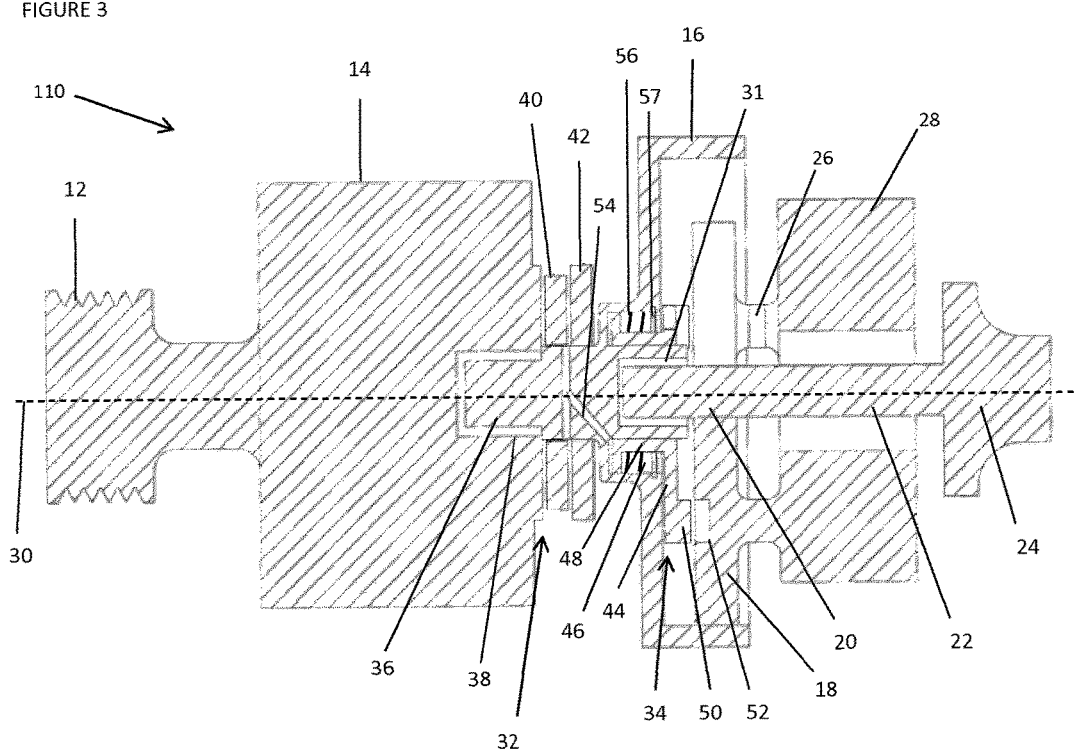
FIG. 3 is an axial cross-section of a generator/supercharger assembly in an arrangement according to an embodiment of the invention.

FIG. 3 illustrates an embodiment of the invention, in which a supercharger generator 110 having a dual clutch system is provided. The arrangement 110 includes a first clutch 32 which is associated with the generator, and a second clutch 34, which is associated with the epicyclic gear train and therefore the supercharger impeller 24.

The first clutch 32 provides the ability to isolate the generator end of the supercharger generator 110 from the supercharger end. In this embodiment, the generator armature 14 is a first armature 14, and has first and second end faces. The first end face is coupled to the pulley 12, and the second end face is detachably coupled to the annulus 16 of the epicyclic gear train via the first clutch 32. In this way, the first armature 14 is arranged for permanent drive from a source of motive power such as the vehicle engine via the pulley 12, although it will be appreciated that the first armature 14 is not driven via the pulley 12 when the vehicle engine is not running. The first armature 14 is sized to suit the normal vehicle demands, in addition to the additional electrical energy which is required to drive the motor armature 28, which in this arrangement is a second armature 28, when the supercharger impeller 24 is operational. The annulus 16 is formed with a projection 36 which is rotatably and slidably received in a corresponding recess 38 formed in the first armature 14, but this is only one of several possibilities for ensuring rotation on the axis 30.

The first armature 14 and the annulus 16 are coupled by means of the first clutch 32, which in this embodiment comprises first and second facings 40, 42. In this way the annulus 16 is arranged to be driven by the first armature 14 when the first clutch 32 is engaged. The facings 40, 42 engage on demand, through the action of an actuating mechanism (not shown) to couple the annulus 16 for rotation with the first armature 14. Thus, the first clutch 32 of this embodiment operates as a friction clutch. However, any suitable clutch device may be employed, including for example those employing magneto-rheological fluids which are familiar to the skilled person.

In use, the first clutch 32 is disengaged when operation of the supercharger impeller 24 is not required, in which case the epicyclic gear train and supercharger impeller 24 are not driven, and typically stationary. As a result, the fuel consumption of the vehicle engine is reduced, because the windage, churning and friction associated with rotation of the supercharger components are avoided. Also, since the annulus 16 is disengaged from the first armature 14, the rotational inertia of the components coupled to the pulley 12 is also substantially reduced as compared with the conventional arrangement, thereby allowing a more rapid change of engine speed. Additionally, fuel consumption is reduced.

When the supercharger is required, the first clutch 32 is engaged by bringing the first and second facings 40, 42 into contact with one another using the actuating mechanism. The annulus 16 is then caused to rotate with the first armature 14, which in turn drives the epicyclic gear train. The second armature 28 is driven electrically by the generator at a speed and rotational sense appropriate to the desired output of the supercharger. Therefore, when the first clutch is engaged, or closed, the supercharger generator 110 operates in exactly the same manner as the prior art arrangement 10 described above.

The second clutch 34 operates to lock the planets 18 to the annulus 16, thus preventing relative rotation of the planets 18 and the annulus 16. In this way, the second clutch 34 is operable to lock the epicyclic gear train. In this embodiment, the second clutch 34 is provided in the form of a dog clutch, so that rotation of the planets 18 is prevented by the second clutch 34 through interference, and not by friction. The second clutch 34 comprises a main body 44 which is attached to the annulus 16, between an inside face of the annulus 16 and the planets 18. The annulus 16 is formed with an annular chamber 46 which surrounds the cavity 31 within which the drive shaft 22 is received. The main body 44 of the second clutch 34 is formed with a projection 48 on its inner edge which extends into the annular chamber 46. The main body 44 comprises a dog 50 which extends from an outer edge of the main body 44. Each of the planets 18 includes a recess 52 which is arranged to receive the dog 50 of the second clutch 34. In this embodiment, there is a single dog 50, which engages the nearest planet 18, although in other embodiments the second clutch 34 comprises a respective dog 50 for each planet 18.

The extension 48 of the main body 44 is slidably received in the annular chamber 46, such that the main body 44 is able to move towards and away from the planets 18. This movement may be effected by supplying high-pressure oil into the space between the extension 48 and an end face of the annular chamber 46. The oil is conveniently supplied by a pump (not shown) to distribute oil throughout the prior art supercharger generator 10. The oil penetrates the space beyond the extension 48 of the main body 44 through a channel 54 which is formed in the body of the annulus 16. A spring 56 is provided on the opposite side of the extension 44 to the high pressure oil. The spring 56 is retained by a circlip 57 and acts as a return mechanism to urge the main body 44 back into the annular chamber 46 when the high pressure oil is removed.

When the second clutch 34 is open, and the main body 44 is in a retracted position away from the planets 18, the planets 18 are free to rotate. When the main body 44 is moved towards the planets 18 into a closed position under the action of high-pressure oil, the dog 50 engages with a recess 52 in one of the planets 18, which prevents the planets 18 from rotating. In this way, the second clutch 34 disengages or disables the epicyclic gear train.

When the second clutch 34 is closed and the epicyclic gear train is disabled, this causes the entire supercharger generator 110 to rotate together at the same speed. In particular, in this situation, the second armature 28 is forced to rotate at the same speed as both the impeller 24 and, if the first clutch 32 is closed, the pulley 12. Therefore, when the second clutch 34 is closed, the second armature 28 may be driven by either the impeller 24 or the pulley 12, depending on the vehicle operating conditions. Closing the second clutch 34 may additionally be viewed as effectively coupling the second armature 28 to the annulus 16. In this way, the second armature 28 can be used as a secondary generator in certain situations to increase overall generating capacity. Therefore, the system provides a dual generator arrangement in certain circumstances which beneficially offers an increased charging rate of the vehicle battery when the two generators cooperate.

Alternatively, the first armature 14 may be operated in reverse to act as a motor and provide drive to the vehicle, either to re-start the vehicle engine, or to drive the vehicle directly over short distances. This may be useful, for example, if the engine is stopped and then re-started again within a short time period while the engine is still hot, for example when the vehicle is sitting in slow-moving traffic, or waiting at traffic lights. In this situation, the generator may be used as a belt-integrated starter-generator (BISG), to restart the vehicle engine after each cessation of vehicle movement. Restarting the engine in this way is far more fuel-efficient that a cold-start procedure. Therefore, such a system and control strategy can be used to save fuel in, city driving where stops are frequent, and stopping the engine reduces the amount of time that it spends idling. However, the use of the first armature 14 in this way is dependent on the engine components still being hot such that the engine is easier to start. In particular, when the engine lubricating oil is hot it is more effective, which means that the frictional forces which must be overcome in order to start the engine are reduced. If the engine cools too much, for example if the vehicle is stopped for a more extended time period, then the drive belts will not cope with the increased forces required to restart the engine. As such, using the first armature 14 in this way is limited to situations where the engine is still hot.

Furthermore, a generator may be used as a motor to provide an anti-stalling mechanism, where a region of the engine operating map may tend towards stalling; by this means a minimum engine speed is maintained until the vehicle engine moves into a different region of the engine operating map.

Generally, a vehicle generator may be over-sized in order to also serve in BISG or anti-stalling mode. The ability to effectively couple the first armature 14 to the second armature 28 by closing both the first and second clutches 32, 34 enables the second armature 28 to provide additional power for performing the restart function described above. This may minimise the amount by which the size of the vehicle generator must be increased in order to provide the BISG functionality. The dual generator arrangement provides additional motor capacity for BISG or anti-stalling, at minimal additional cost, it being understood that in both these modes of use supercharging is not required. It will also be understood that whilst the supercharger is unloaded, motive power can be provided not only from the motor comprising the first armature 14, but also from the second armature 28.

In a further refinement, the first armature 14 together with the second armature 28 may be used to drive the normal internal combustion engine as a micro-hybrid, optionally in conjunction with the second armature 28 of the supercharger. Such an arrangement, dependent upon the capacity of the vehicle battery, may provide short term motive power or assistance for the vehicle; in particular in low speed city driving. When the armatures 14, 28 are driven, the vehicle engine effectively freewheels, and the torque is passed to the transmission to propel the vehicle. It will be appreciated that using the armatures 14, 28 to drive the engine in this way consumes a considerable amount of energy, thus the range over which the vehicle may be propelled in this manner is limited.

The skilled person will appreciate that a supercharger may be required for a relatively short proportion of engine running time; accordingly a considerable saving of fuel is possible by elimination of windage, churning and friction losses through the ability to disengage the supercharger when it is not required.

The supercharger generator 110 also allows for engagement of the first clutch 32 in anticipation of a requirement for operation of the supercharger impeller 24, thus bringing the supercharger impeller 24 up to speed in advance of loading the impeller 24 in the chamber and enabling operation thereof. The EMU may, for example, monitor accelerator pedal position and/or rate of change of accelerator pedal position, and signal engagement of the first clutch 32 just before supercharging is required. The second armature 28 may also be driven for this purpose from the permanently driven generator (i.e. armature 14) since the additional electrical requirement is low because the supercharger is unloaded.

Thereafter, typically a moment later, the supercharger is brought on load, and the second armature 28 is driven from the first armature 14. By this means the supercharger impeller 24 may be driven, whilst unloaded, at a speed appropriate for instant supercharging, if required.

In an alternative embodiment the annulus 16 may be driven directly, for example, closing the second clutch 34 and using the second armature 28 to drive the annulus 16, to bring the annulus 16 up to a speed compatible with the speed of the first armature 14. Such an arrangement both reduces the engagement loading on clutch facings 40, 42, and speeds up the impeller 24 ready for supercharging.

This embodiment relies upon the use of a rotary electrical machine as both generator and motor, which can be readily accomplished with appropriate design and controls. When supercharging is required, the motor comprising armature 14 may be converted instantly into a generator for supplying energy to power the supercharger motor 28.

The desired speed or output of the supercharger of any embodiment may be given by an algorithm or look-up table of a memory of the EMU, according to empirical testing of a particular engine configuration, and the motor 28 driven accordingly by a suitable control system.

Where speed of the armature 14 and annulus 16 can be matched by utilizing the second armature 28, it will be understood that a dog clutch may be used to replace the progressive engagement provided by a friction clutch or a magneto-rheological coupling, or the like. Such an arrangement may permit a more instant response, and be less complex. A dog clutch may include a speed matching device, such as is provided in a synchromesh hub of a vehicle gearbox.

Figure 4:
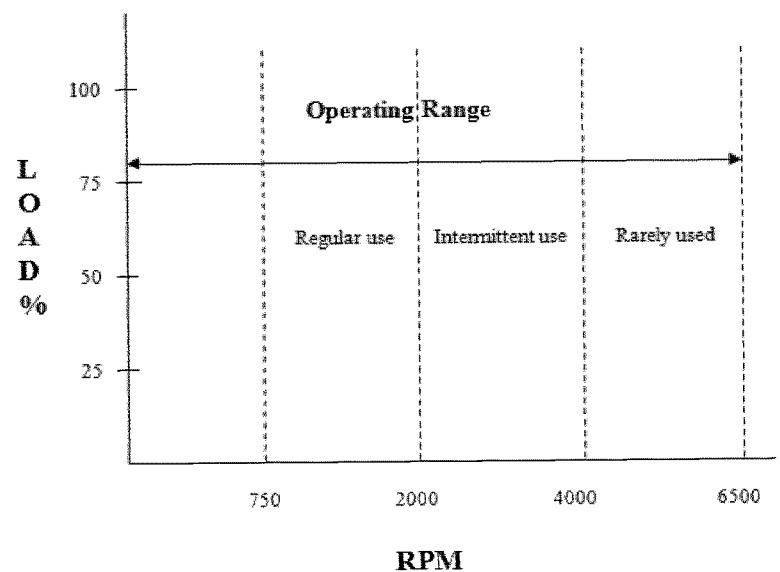
FIG. 4 is a graph which indicates the engine operating range of the arrangement shown in FIG. 3.

With reference to FIGS. 4, 5 and 6, a control regime according to an embodiment of the invention which is to be applied to the above-described supercharger generator 110 is illustrated. This embodiment of the control regime applies when the supercharger generator 110 is used in conjunction with a turbocharger. FIG. 4 shows the duty cycle for the supercharger impeller 24 throughout a typical engine operating range for a vehicle. As shown in the graph, the impeller 24 is regularly operational in the range of 750 to 2000 rpm. This is because at these low engine speeds the speed of the engine exhaust gases is too low to provide sufficient power to drive the turbocharger. Therefore, the supercharger is used in order to eliminate "turbo lag", as described previously.

In the 2000 to 4000 rpm range, the supercharger is used intermittently; normally the turbocharger operates effectively at these engine speeds. However, if there is a sudden change in torque demand, there may be a lag as the turbo catches up. This may happen, for example, during acceleration. Therefore, the supercharger is used during the period of changing demand to ensure consistent power delivery from the engine, until the turbocharger has had time to spool up.

Above 4000 rpm, the associated speed of the engine exhaust gases is sufficient to drive the turbocharger in most situations, and therefore the supercharger is rarely used in this range. In this embodiment of the control regime, the supercharger is not used under these operating conditions, although in other embodiments there may be particular circumstances in which the supercharger is called into operation, for example when the throttle is operated particularly aggressively.

FIG. 5 is a table which illustrates how the first clutch 32 and the second clutch 34 are operated for a number of different scenarios, according to this embodiment of the control regime. The table additionally indicates whether the armature 28 of the electric motor is used to drive the planets 18 in each scenario. It should be noted that there are three states for the second armature 28: "driven" in which the armature 28 is driven electrically to turn the planets 18 for the purpose of adjusting the rotational speed of the impeller 24; "not driven" in which the armature 28 is idle and free to rotate in either sense and at any speed; and "acting as additional generator" in which case the armature 28 is locked to the annulus 16 through the closure of the second clutch, so that the armature 28 may be driven by the impeller 24 or the pulley 12 to act as an additional generator as described above. More detailed explanations of each scenario are outlined below.

A "cold-start" scenario refers to starting the vehicle engine using a starter motor when the engine is cold, i.e. when it has not been used for more than a few minutes. During a cold-start procedure, the supercharger is not used, as this would place unnecessary strain on engine components. Also, there is no need to use the supercharger during a cold-start, as the vehicle is not moving and therefore there is no torque demand placed on the engine. Accordingly, as shown in FIG. 5, during a cold-start procedure, both the first clutch 32 and the second clutch 34 are open. Additionally the second armature 28 does not drive the planets 18. By opening the first clutch 32 at this time the supercharger is disengaged, and therefore the vehicle does not unnecessarily expend energy driving the second armature 28 and the supercharger impeller 24, thereby improving fuel efficiency during the cold-start procedure.

As neither the supercharger components nor the second armature 28 are driven during a cold-start procedure, it does not particularly matter whether the second clutch 34 is open or closed during the cold-start. However, the next step after a cold-start is for the vehicle to pull away. Therefore, by arranging for the second clutch 34 to be open during a cold-start, the second clutch 34 is placed in the correct position in readiness for when the vehicle needs to pull away. As the vehicle pulls away, a torque demand is placed on the engine, at which time the supercharger impeller 24 is called into operation. Therefore, the second clutch 34 needs to be open when the vehicle is pulling away. If the second clutch 34 were closed initially when the engine received the torque demand, the second clutch would first need to be opened before the supercharger impeller 24 could operate. Therefore, by opening the second clutch 34 during a cold-start, the vehicle may offer improved responsiveness in the event that an initial torque demand is placed on the engine.

It is noted that in this embodiment of the control regime, in all cases where the first clutch 32 is open, the second armature 28 is not driven. This is because the second armature 28 does not have sufficient power to drive the impeller 24. Also, when the first clutch 32 is open, the annulus 16 can rotate freely. Therefore, driving the second armature 28 in this scenario would result in unpredictable movement of the gear train components. In particular, if the second clutch 34 is open, the impeller 24 is also free to rotate semi-independently of the second armature 28. Therefore, driving the second armature 28 may simply result in the armature 28 and planets 18 rotating while the impeller 24 and annulus 16 remained relatively stationary, thereby wasting energy.

A "hot-start" scenario refers to what is commonly known as "stop-start", in which the vehicle engine uses the generator as a motor in certain conditions, as described previously. As shown in FIG. 5, during a hot-start procedure, both the first clutch 32 and the second clutch 34 are closed. By enabling the first armature 14 to be driven by the generator, the full capacity of the generator is utilised for providing a drive force. In addition to this, as both the first and second clutches are closed, the second armature 28 may be driven in cooperation with the first armature 14, in order to maximise the drive force available. This drive force is used to drive the pulley 12, thus driving the auxiliaries drive belt, and therefore re-starting the engine.

Alternatively, in another embodiment the first armature 14 and the second armature 28 are used in cooperation to drive the vehicle over short distances, thus acting as a micro-hybrid as described above. This arrangement is equivalent to a "hot-start" except for the fact that the engine is not supplied with fuel in order to commence normal operation, instead the first armature 14 and the second armature 28 continue to drive the engine in order to provide torque to the vehicle transmission to propel the car. Accordingly, the configuration for the supercharger generator 110 in this scenario is the same as for a "hot-start", and therefore is not listed separately in FIG. 5.

In "idle" the engine is running but the vehicle is not moving. Therefore, there is no torque demand placed on the vehicle, so the supercharger is not required. In order to minimise the fuel consumption of the engine when idling, the first clutch 32 is opened to isolate the pulley 12 from the epicyclic gear train and the impeller 24, thus minimising the load attached to the engine. Therefore, only the first armature 14 is rotated when idling, which means that the generator produces only the energy which is required for normal operation, and does not burden the engine by generating excess electrical energy which is not required at that time.

FIG. 5 indicates that the arrangement of the second clutch 34 is not applicable in idling conditions. However, as described above, the second clutch 34 is preferably open at this time, such that the second clutch 34 is ready for a new torque demand being placed on the vehicle engine.

The "idle after start low ambient" condition shown in FIG. 5 relates to a particular condition where the engine is idling and the ambient temperature is low. Under such conditions, the normal power requirements of the vehicle may be increased in order to heat the interior of the vehicle. In normal idling conditions, the engine idles at low speed, and therefore the generator does not produce much electrical energy. Therefore, in order to improve the generating capacity of the generator when the power requirements are raised, both the first clutch 32 and the second clutch 34 are closed. By closing both the first and second clutches 32, 34, the first armature 14 is effectively coupled to the second armature 28, such that the two rotate together. The second armature 28 is not driven at this point; instead it is used as an additional generator, to further increase the generating capacity of the vehicle as described previously.

The "steady state–low load<4000 rpm" condition relates to when a vehicle is cruising at a substantially constant speed, with an engine speed below 4000 rpm. When the vehicle is travelling at a constant speed, the torque demand placed on the engine is relatively low. Therefore, the supercharger impeller 24 is not loaded at this point as the additional torque which it provides is not required. In order to avoid the impeller 24 idling and therefore wasting energy and consuming additional fuel, the first clutch 32 is opened. In this way, the impeller 24 is disassociated from the engine, and is therefore not driven unnecessarily. As the first clutch 32 is open, the second armature 28 is not driven at this stage for the reasons described above. Specifically, in this condition there is no requirement for the impeller 24 to be driven, and therefore there is no reason to drive the second armature 28. If the engine speed is sufficient, towards the higher end of the range for this condition, the turbocharger may be used, primarily in order to improve the operating efficiency of the engine by extracting energy from the exhaust gases.

The "steady state–high load<1500 rpm" condition relates to circumstances in which a high load is placed on the vehicle, but the engine speed is kept low. For example, this could relate to a scenario in which a vehicle is towing a load in a high gear. This example applies mainly to vehicles provided with a manual gearbox, as an automatic gearbox would normally shift into a lower gear when towing in order to avoid stalling.

In this situation, the torque demand placed on the engine is relatively high, but the engine speed is too low for the turbocharger to operate effectively. Therefore, the supercharger impeller 24 is loaded in the chamber and driven in order to increase engine performance. To achieve this, the first clutch is closed 32, the second clutch 34 is opened and the second armature 28 is driven, such that the impeller 24 is driven in the normal manner described previously.

"Steady state>4000 rpm" refers to situations where the vehicle is cruising at a substantially constant speed, and the engine speed is above 4000 rpm. In general this relates to cruising at high speed, for example in motorway driving. As the engine speed is high, the turbocharger is used in order to improve the fuel economy and to provide any additional power which may be required. Therefore, the supercharger is deactivated in the same way as for the "steady state–low load<4000 rpm" condition.

The "transient<4000 rpm" mode relates to a condition where there is a sudden change in torque demand when the engine speed is below 4000 rpm. When the engine is running below this speed, the turbocharger is running at a relatively low speed. When the torque demand changes, for example if the driver opens the throttle, the engine responds by rapidly increasing the engine speed. The turbocharger cannot speed up at the same rate as the engine, and therefore there will be a difference between the desired manifold pressure and the actual manifold pressure as the turbocharger catches up with the engine, resulting in "turbo lag". The supercharger can be used to alleviate this problem, by maintaining the required manifold pressure during the time that the turbocharger is spooling up. Therefore, for this condition the first clutch 32 is closed, the second clutch 34 is open, and the second armature 28 is driven, so that the supercharger operates to drive the impeller 24 in the normal way, as described previously.

The "transient>4000 rpm" relates to a similar condition to the previously described "transient<4000 rpm" condition, with the difference being that the engine speed is above 4000 rpm. When the engine is running above this speed, the turbocharger is also running at a relatively high speed. Therefore, if there is a change in the torque demand, and therefore a change in the required manifold pressure, the turbocharger is able to meet these demands without falling behind the engine with a resulting "turbo lag". Therefore, the supercharger is not required in this situation. As such, the first clutch 32 is opened, to disassociate the supercharger from the engine and minimise the load on the engine by preventing the supercharger from idling. Accordingly, the second armature 28 is not driven, for the reasons described previously for when the first clutch 32 is open. The second clutch 34 may be either open or closed in this situation as the gear train is not being driven. However, as the vehicle is moving at high speed in this scenario, it is likely that the supercharger will not be required again until the vehicle has slowed significantly. Therefore, it may be preferable to have the second clutch 34 closed, in readiness for using the supercharger generator 110 in "Regen Mode" as the vehicle slows, which is described below.

"Regen Mode" relates to a situation where a vehicle is slowing down under engine braking. As the engine continues to turn, the pulley 12 is rotated. Therefore, there is an opportunity to extract some energy from the system which would otherwise be wasted, by using the rotation of the pulley 12 to generate electrical energy to be stored in the vehicle battery. In order to extract as much energy as possible, the control regime is arranged to optimise the generating capacity of the supercharger generator 110 by using the first armature 14 in cooperation with the second armature 28 as an additional generator. Therefore, both the first clutch 32 and the second clutch 34 are closed, so that the first armature 14 and the second armature 28 are effectively coupled together. In this way the armatures 14, 28 can cooperate to generate electrical energy in the same way as for the "idle after start low ambient".

FIG. 7 illustrates a process 58 for implementing the above-described control regime. In this embodiment, the process 58 is conducted by the EMU. The EMU identifies at step 60 the current operating condition as defined above with reference to FIG. 5. The EMU then determines at step 62 the appropriate configuration for the supercharger generator 110 for the condition identified at step 60. The EMU then checks at step 64 whether the supercharger generator 110 is configured correctly. If the arrangement 110 is configured correctly, the process 58 ends at step 68. If the arrangement 110 is not configured correctly, the EMU reconfigures at step 66 the supercharger generator 110 accordingly. The process 58 then ends at step 68.

As shown in FIG. 8, the invention also extends to a vehicle 70 comprising a supercharger generator 110 as described above. FIG. 8 also illustrates the vehicle 70 having an exhaust-driven turbocharger 112 as described above.

It will be appreciated by a person skilled in the art that the invention could be modified to take many alternative forms to that described herein, without departing from the scope of the appended claims.

Embodiments of the present invention may be understood by reference to the following numbered paragraphs:

1. A vehicle supercharger assembly comprising;
    a generator comprising a first armature being adapted for permanent drive from a source of motive power;
    a supercharger impeller arranged to be driven via a gear train;
    an electric motor comprising a second armature, said second armature being coupled to the gear train;
    a first clutch for selectively coupling the first armature to the gear train for driving the supercharger impeller in a first mode of operation in which the electric motor is operable to adjust the speed of the supercharger impeller; and
    a second clutch, operable when said first armature is coupled to the gear train, for selectively locking the gear train so as to prevent relative rotation of the first and second armatures in a second mode of operation.

2. A supercharger assembly according to paragraph 1, wherein the gear train is an epicyclic gear train comprising an annulus, a sun, a plurality of planets and a planet carrier; wherein: the first clutch couples the annulus to the first armature; the planet carrier is coupled to the second armature such that the electric motor is operable to drive the planet carrier; and the supercharger impeller is coupled to the sun.

3. A supercharger assembly according to paragraph 1, wherein the first mode of operation is a supercharging mode in which the electric motor is driven by a generator comprising the first armature.

4. A supercharger assembly according to paragraph 1, wherein the second mode of operation is at least one of the following modes: (1) a dual generator mode, in which the electric motor is arranged to operate as a generator to boost the generating capacity of the vehicle; and (2) a dual motor mode, in which the first armature is arranged to operate as a motor to provide a motive force to the vehicle, such that the assembly acts as a belt-integrated starter-generator (BISG) or as a micro-hybrid.

5. A supercharger assembly according to paragraph 4, wherein, when the second mode of operation is mode (2), the assembly acts as a micro-hybrid to propel the vehicle.

6. A supercharger assembly according to paragraph 1, wherein a third mode of operation is defined when the gear train is decoupled from the first armature.

7. A supercharger assembly according to paragraph 1, wherein the first clutch is located between an end face of the first armature and the gear train.

8. A supercharger assembly according to paragraph 1, wherein the electric motor provides variable, bi-directional drive to adjust the rotational speed of the supercharger impeller.

9. A supercharger assembly according to paragraph 2, wherein the second clutch is arranged to disengage the gearing mechanism by locking the epicyclic gear train such that relative rotation of the planets and the annulus is prevented.

10. A supercharger assembly according to paragraph 9, wherein the second clutch is in the form of a dog clutch arranged to interengage the annulus and at least one of the planets.

11. A supercharger assembly according to paragraph 10, wherein the dog clutch is arranged to be disengaged hydraulically.

12. A control unit for a supercharger assembly according to paragraph 1, and comprising an electronic control unit for controlling operation of the first clutch means, the second clutch and the electric motor, and for enabling the supercharger.

13. A control unit according to paragraph 12, wherein said control unit is further arranged to configure said first armature as a motor arranged to drive said source of motive power.

14. A method of operating a supercharger assembly according to paragraph 1, wherein the method comprises uncoupling the first armature from the gear train and unlocking the gear train in at least one of the following conditions: (a) during an engine cold-start procedure; and (b) when the vehicle is idling.

15. A method of operating a supercharger assembly according to paragraph 1, wherein the method comprises operating the supercharger assembly in the second mode of operation and using the second armature as a generator in at least one of the following conditions: (1) when the ambient temperature is low and the engine is idling; or (2) when the speed of the vehicle is decreasing and there is no torque demand placed on the engine.

16. A method of operating a supercharger assembly according to paragraph 4, wherein the method comprises operating the supercharger assembly in mode (2) of the second mode of operation, and using the drive force to restart the engine following a cessation of engine operation.

17. A method of operating a supercharger assembly according to paragraph 4, wherein the method comprises operating the supercharger assembly in mode (2) of the second mode of operation, and using the drive force to provide motive power to the vehicle.

18. A vehicle comprising an exhaust-driven turbocharger and a supercharger assembly according to paragraph 1, in which the supercharger assembly and the turbocharger are arranged to operate sequentially.

19. A vehicle according to paragraph 18, wherein the vehicle is arranged to use the turbocharger and not the supercharger when the engine speed is above a first threshold.

20. A vehicle according to paragraph 19, wherein the vehicle is arranged to use the supercharger and not the turbocharger if the engine speed is below a second threshold, wherein the second threshold is lower than the first threshold.

21. A method for operating a vehicle according to paragraph 19, wherein the method comprises uncoupling the first armature from the gear train when the engine speed is above the first threshold.

22. A method for operating a vehicle according to paragraph 19, wherein the method comprises coupling the first armature to the gear train when the engine speed falls below the second threshold.

23. A method for operating a vehicle according to paragraph 20, wherein the method comprises uncoupling the first armature from the gear train during steady-state engine operating conditions when the engine speed is above the second threshold, and when the vehicle is towing a relatively high load.

24. A method for operating a vehicle according to paragraph 19, wherein the method comprises coupling the first armature to the gear train and unlocking the gear train during a period of increasing torque demand upon the engine when the engine is operating below the first threshold.

25. A vehicle having a supercharger assembly according to paragraph 1.

26. A vehicle having a control unit according to paragraph 12.

The invention claimed is:

1. A vehicle supercharger assembly comprising:
 a generator comprising a first armature being adapted for permanent drive from a source of motive power;
 a gear train;
 a supercharger impeller arranged to be driven via the gear train;
 an electric motor comprising a second armature, said second armature being coupled to the gear train;
 a first clutch, for selectively coupling the first armature to the gear train for driving the supercharger impeller in a first mode of operation in which the first clutch is in a closed position and in which the electric motor is operable to adjust a rotational speed of the supercharger impeller, the first armature being isolated from the gear train when the first clutch is in an open position; and
 a second clutch, operable when said first armature is coupled to the gear train, for selectively locking the gear train so as to prevent relative rotation of the first and second armatures in a second mode of operation.

2. The supercharger assembly according to claim 1, wherein the first mode of operation is a supercharging mode in which the electric motor is driven by the generator comprising the first armature.

3. The supercharger assembly according to claim 1, wherein the electric motor provides variable, bi-directional drive to adjust the rotational speed of the supercharger impeller.

4. The supercharger assembly according to claim 1,
 wherein the gear train is an epicyclic gear train comprising an annulus, a sun, a plurality of planets and a planet carrier;
 wherein the first clutch couples the annulus to the first armature;
 wherein the planet carrier is coupled to the second armature such that the electric motor is operable to drive the planet carrier; and
 wherein the supercharger impeller is coupled to the sun.

5. The supercharger assembly according to claim 4, wherein the first clutch is located between an end face of the first armature and the gear train and/or the second clutch is arranged to disengage the gear train by locking the gear train such that relative rotation of the planets and the annulus is prevented.

6. The supercharger assembly according to claim 1, wherein the second mode of operation is at least one of the following modes:
 a dual generator mode, in which the electric motor is arranged to operate as a generator to boost the generating capacity of the vehicle; and
 a dual motor mode, in which the first armature is arranged to operate as a motor to provide a motive force to the vehicle, such that the assembly acts as a belt-integrated starter-generator (BISG) or as a micro-hybrid.

7. The supercharger assembly according to claim 6, wherein the second mode of operation is the dual motor mode, and wherein the assembly acts as a micro-hybrid to propel the vehicle.

8. A method of operating the supercharger assembly of claim 6, comprising operating the supercharger assembly in the dual motor mode of the second mode of operation, and using drive force to restart a vehicle engine following a cessation of engine operation.

9. A vehicle having the supercharger assembly of claim 1.

10. A method of operating the supercharger assembly of claim 1, comprising isolating the first armature from the gear train and unlocking the gear train in at least one of the following conditions: (a) during an engine cold-start procedure; and (b) when the vehicle is idling.

11. A method of operating the supercharger assembly of claim 1, comprising operating the supercharger assembly in the second mode of operation and using the second armature as a generator in at least one of the following conditions: when ambient temperature is below a prescribed threshold temperature and a vehicle engine is idling; or when a speed of the vehicle is decreasing and there is no torque demand placed on the engine.

12. A control unit for the supercharger assembly of claim 1, and comprising an electronic control unit for controlling operation of the first clutch, the second clutch and the electric motor, and for enabling a supercharger of the supercharger assembly.

13. The control unit according to claim 12, wherein said control unit is further arranged to configure said first armature as a motor arranged to drive said source of motive power.

14. A vehicle having the control unit of claim 12.

15. A vehicle comprising an exhaust-driven turbocharger and the supercharger assembly of claim 1, wherein the supercharger assembly and the turbocharger are arranged to operate sequentially.

16. The vehicle of claim 15, wherein the vehicle is arranged to use the turbocharger and not the supercharger assembly when vehicle engine speed is above a first threshold.

17. A method for operating the vehicle of claim 16, comprising isolating the first armature from the gear train when the engine speed is above the first threshold.

18. A method for operating the vehicle of claim 16, comprising coupling the first armature to the gear train and unlocking the gear train during a period of increasing torque demand upon the engine when the engine is operating below the first threshold.

19. The vehicle of claim 16, wherein the vehicle is arranged to use the supercharger and not the turbocharger if the engine speed is below a second threshold, wherein the second threshold is lower than the first threshold.

20. A method for operating the vehicle of claim 19, comprising isolating the first armature from the gear train during steady-state engine operating conditions when the engine speed is above the second threshold, and when the vehicle is towing a load having a mass greater than a prescribed threshold mass.

\* \* \* \* \*